Sept. 14, 1954  F. A. BONAVENTURA ET AL  2,688,922
SOLAR ENERGY PUMP
Filed Oct. 27, 1951

INVENTOR.
FILIBERTO A. BONAVENTURA &
DONALD E. PLYMPTON
BY
*Wm. H. Dean*
AGENT

Patented Sept. 14, 1954

2,688,922

UNITED STATES PATENT OFFICE 2,688,922

SOLAR ENERGY PUMP

Filiberto A. Bonaventura, La Mesa, and Donald E.
Plympton, San Diego, Calif.

Application October 27, 1951, Serial No. 253,508

10 Claims. (Cl. 103—1)

Our invention relates to a solar energy pump, more particularly for use in pumping water or other liquids by means of solar energy and the objects of our invention are:

First, to provide a pump of this class having novel means for periodically concentrating solar energy on a boiler provided with check valves therein whereby the boiler is alternately heated and cooled creating resultant expansion and contraction in said boiler promoting pumping action through said valves during each heating and cooling cycle;

Second, to provide a solar energy pump of this class having novel means for successively disposing different members of a plurality of boilers in the area of solar energy concentration imposed by a reflector or condenser;

Third, to provide a solar energy pump of this class which may be used to provide kinetic energy from the sun's rays;

Fourth, to provide a solar energy pump of this class which is fully automatic in operation;

Fifth, to provide a solar energy pump of this class which is very simple and easy to maintain;

Sixth, to provide a solar energy pump of this class having a relatively slow cycle speed wherein all of the operating elements are very durable and may be used to withstand considerable pressures and produce considerable power; and Seventh, to provide a solar energy pump of this class which is very simple and economical of construction, efficient in operation and which will not readily deteriorate or get out of order.

With these and other objects in view as will appear hereinafter our invention consists of certain novel features of construction combination and arrangement of parts and portions and a certain modification as will be hereinafter described in detail and particularly set forth in the appended claims, reference being had to the accompanying drawings and to the characters of reference thereon forming a part of this application in which:

Similar characters of reference refer to similar parts and portions throughout the several views of the drawings.

Figure 1:
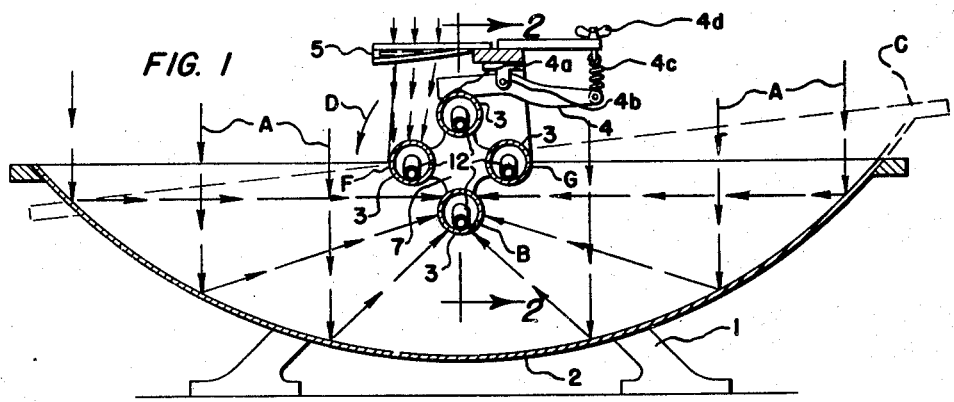
Figure 1 is a cross sectional view of our solar energy pump.

Frame 1, reflector 2, boilers 3, boiler detent 4, lens 5, boiler inlet manifold 6, boiler outlet manifold 7, boiler inlet valves 8, boiler outlet valves 9, boiler outlet conductor 10, boiler inlet conductor 11, boiler exhaust tubes 12, and the packing glands 13 and 14 constitute the principal parts and portions of our solar energy pump.

Figure 2:
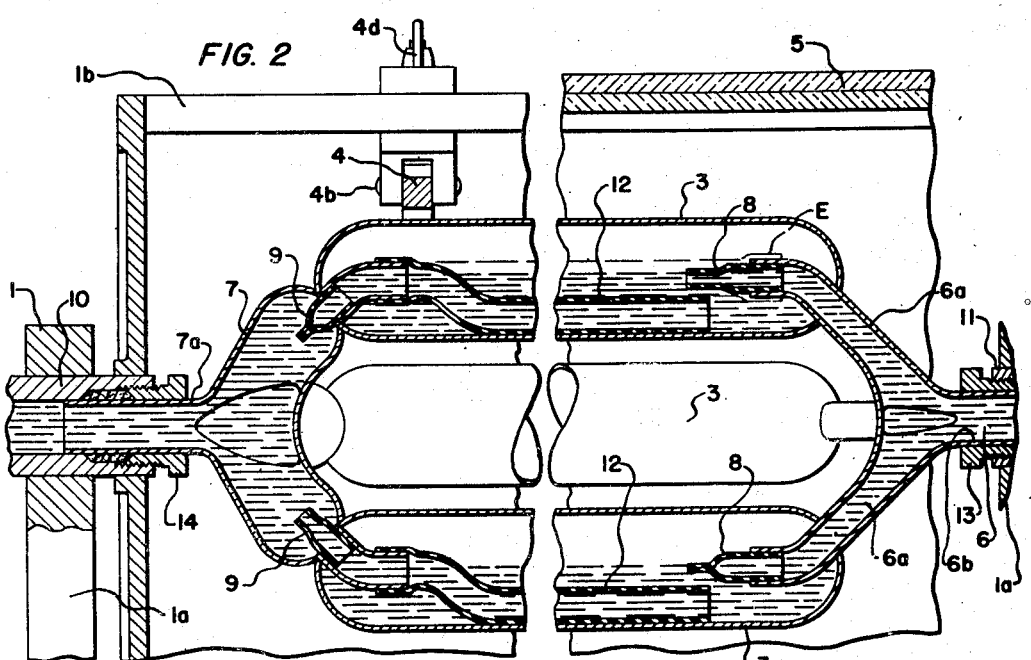
Figure 2 is an enlarged longitudinal sectional view thereof taken from the line 2—2 of Fig. 1 showing portions broken away to facilitate the illustration.

The reflector 2 forms a condenser for the sun's rays A and concentrates them on the particular boiler 3 in the position B as shown in Fig. 1 of the drawings. This reflector 2 is supported on the frame 1 and may be tilted as desired to accommodate the seasonal angle of the sun's rays according to the particular location of the reflector 2. The dash line position C of the reflector 2 illustrates its adjustable relationship with the frame 1. The boilers 3 are hollow cylindrical boilers sealed at opposite ends in communicative relationship with the boiler inlet manifold 6 and the boiler outlet manifold 7, shown best in Fig. 2 of the drawings. Connected with the individual branch conductors 6a of the inlet manifold 6 are the valves 8 which are conventional check valves arranged to prevent the flow of liquid from the boilers 3 into the boiler inlet manifold 6. These check valves 8 permit liquid to flow freely from the boiler inlet manifold 6 into the boilers 3. The boiler outlet valves 9 are arranged to permit flow of liquid or steam from the boilers 3 into the boiler outlet manifold 7 and these valves 9 are check valves adapted to prevent flow of fluid from the boiler outlet manifold 7 into the boilers 3. The boiler outlet conductor 10 and the boiler inlet conductor 11 are substantially identical in construction and are fixed in the upright portions 1a of the frame 1 into which the concentric tubular shanks 7a and 6b of the outlet and inlet manifold 7 and 6 respectively extend. Screw threaded in the ends of the outlet and inlet conductors 10 and 11 are the packing glands 14 and 13 respectively which surround the tubular portions 7a and 6b of the outlet and inlet manifolds 7 and 6 respectively. Connected to the inlet conductor 11 is a suitable source of supply maintaining water available to the inlet manifold 6 while the outlet conductor 10 may be connected with any of the large variety of mechanisms for converting steam pressure to kinetic energy. Positioned on the interior of the boiler 3 and communicating with the inlet side of the boiler outlet valves 9 are the exhaust tubes 12. These exhaust tubes 12 are adapted to dispose themselves at the lower portions of the boilers 3 at all times due to their flexible character. In movement of these tubes 12 to the lower portions of the boiler 3 by gravity, they dispose themselves in the lowermost portion of the boilers 3 and during heating thereof conduct water from the lower portion of the boiler as pressure therein arises due to heating thereof by the concentration of the sun's rays by the reflector 2. If it is desired to employ fluid internally of the boiler 3 having a low boiling point and concurrently permit water to flow through the inlet and outlet manifolds 6 and 7, the exhaust tubes 12 are disposed as indicated by the dash line position E in Fig. 2 of the drawings in direct surrounding relationship with the valves 8 so that water passing through the valve 8 is conducted directly into the tube 12 and outwardly through the valve 9 in each of the boilers 3. Fluid of a lower boiling point than water may then be used in the boiler 3 and expansion and contraction will cause compression and release of the resilient exhaust tubes 12 which creates a similar puffing action to the alternate creation of pressure and vacuum in the boilers 3 as will be hereinafter described in detail. The detent 4, is provided with a notch 4a adapted to engage one of the boilers 3 for holding the lowermost boiler as shown in Fig. 1 of the drawings in centric relationship with the reflector 2. The detent 4 is pivoted on a pin 4b, supported by the bracket 1b of the frame 1 which is supported on the inlet and outlet conductors 11 and 10 respectively near opposite ends of the frame 1. This detent 4 being a pivoted lever is provided with a tension spring 4c having an adjustment nut 4d in order to provide proper detent pressure for the notch 4a in engagement with one of the boilers 3. The lens 5 as shown in Fig. 1 of the drawings provides for slight condensation of the sun's rays on one of the boilers 3 which is in position to be the next succeeding boiler of the group to be disposed in the position B for heating thereof all as will be hereinafter described in the operation of the invention.

The operation of our solar energy pump is substantially as follows:

When the inlet conductor 11 is in communicative relationship with a source of water, and when the sun's rays, as indicated by the arrows A in Fig. 1 of the drawings, are condensed by the reflector 2 under the surfaces of the lowermost boiler 3 as shown in Fig. 1 of the drawings, the concentration of heat on said boiler 3 causes the water therein to become heated creating pressure internally of the boiler 3 which maintains the respective check valve 8 closed while the check valve 9 is open dispensing liquid into the outlet manifold 7 through the exhaust tube 12. When the liquid is exhausted, steam may progress through the exhaust tube 12 and into the outlet manifold 7 which conducts the liquid under pressure into the outlet conductor 10. The check valves 8 and 9 are resilient and very sensitive in operation and as soon as the boiler 3 in a position B has been sufficiently heated to exhaust all the liquid therefrom, the boiler 3 in the position F, being full of liquid, causes rotation of the boiler assembly including the inlet and outlet manifolds 6 and 7 in the direction indicated by the arrows D until the boiler at the position F reaches the boiling position B at which time the detent 4 has been engaged by another successive boiler 3 and the boiler 3 which has just been exhausted occupies the position G and the full boiler previously in the position F occupies the position B and the heating progresses within it. When the boiler 3 just exhausted reaches the position G it starts to cool due to the lack of concentration of heat thereon and when the boiler 3 reaches the uppermost position in engagement with the detent 4 condensation therein has taken place to the extent that a vacuum is created whereupon water is drawn through the inlet manifold 6 and the respective inlet valve 8 into the uppermost boiler 3 which is normally completely filled by the time the vacuum has acted upon the inlet valve 8 and the boiler 3 has reached the position F. In this position F the boiler is full and again ready to be disposed within the concentration area of the sun's rays which are condensed by the reflector 2. Thus it will be noted that alternate heating and exhaustion of the fluid in each boiler causes a full boiler of the assembly to gravitate into heating position raising the exhausted boiler in which condensation takes place creating a vacuum which draws water into the exhausted boiler and places it in loaded position ready to gravitate into heating position for a second cycle. It will be noted that the lens 5 causes preheating of the particular boiler 3 in the position F since that particular boiler in the position F is full when it reaches such position and the preheating after the efficiency of the main heating of the boiler 3 in the position B shown in Fig. 1 of the drawings. It will therefore be noted that the continuous operation of our solar energy pump is fully automatic and that it depends only upon the sun's rays A for its operation. All of the valves and moving parts in this pump operate at a slow cycle speed and are therefore very durable and the particular valves disclosed are resilient rubber valves which are very sensitive and provide a quick transition during cycling. As hereinbefore pointed out, it is possible to use a liquid of a low boiling point in the boiler 3 and connect the exhaust tubes 12 directly over the inlet valves 8 so that alternate pressure and vacuum in the boilers 3 resulting from heating and cooling thereof as hereinbefore described causes compression and relaxation of the resilient exhaust tubes 12 which creates a similar pumping action through the valves 8 and 9, thus a low temperature fluid in the boilers 3 may be used for operation in areas where the sun's rays are not received by the reflector 2 at such high temperature.

Figures 3, 4:
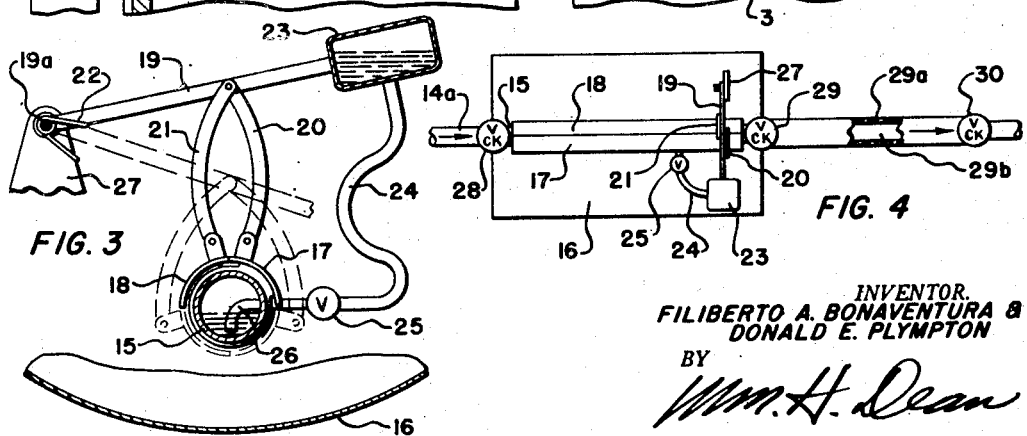
Figure 3 is a transverse sectional view of a modified form of our solar energy pump.
Figure 4 is a top or plan view of the modified structure shown in Fig. 3.

In the modification as shown in Figs. 3 and 4 of the drawings the parts are designated as follows:

The boiler 15, reflector 16, shutters 17 and 18, arm 19, links 20 and 21, spring 22, container 23, conductor 24, valve 25, tube 26, bracket 27, and the valves 28 and 29 and 30.

As shown in Figs. 3 and 4, this boiler 15 corresponds to one of the boilers 3 hereinbefore described while the valves 28 corresponds to one of the inlet valves 8 hereinbefore described and the valve 29 corresponds in operation to one of the valves 9 hereinbefore described. It will be noted that the boiler 15 is a stationary boiler in fixed relationship to the reflector 16 and that the shutters 17 and 18 provide for the alternate exposure of the boiler 15 into the concentration of the sun's rays imposed by the reflector 16 and the shielding of the boiler 15 therefrom to provide for the alternate heating and cooling of the boiler 15 for the operation similar to that hereinbefore described in connection with the structure of Figs. 1 and 2 of the drawings. The shutters 17 and 18 are mounted in centric relationship with the boiler 15 and are pivotally mounted to the links 20 and 21 respectively which are pivoted to the lever 19 which is stationarily pivoted by means of the pin 19a at its one end to the stationary bracket 27 having a spring 22 thereon tending to raise the arm 19 about the pivotal axis of the pin 19a. Fixed on the outer end of the arm 19 is a container 23 having a tube 24 communicating therewith which also communicates at its opposite ends with the metering valve 25 having a tube 26 communicating with the interior of the boiler 15 which is normally partially filled with water or other liquid pumped therethrough. In operation the sun's rays are concentrated or condensed by the reflector 16 onto the boiler 15 wherein the water is heated causing exhaustion thereof through the check valve 29 and closure of the valve 28. At the same time pressure in the boiler 15 causes water to pass upwardly through the tube 26 and through the metering valve 25 which is adapted to restrict the flow and which is an adjustable valve for such purpose. The water flowing upwardly through the valve 25 passes through the tube 24 and into the container 23 and when sufficient water has passed into the container 23 the boiler 15 will be substantially exhausted in accordance with the setting of the valve 25. As the water substantially fills the container 23 the weight thereof causes gravitation of the arm 29 forcing the links 20 and 21 to shift the shutters 17 and 18 downwardly to the lower side of the boiler 15 as indicated by dash lines in Fig. 3 of the drawings shielding the same from the condensed sun's rays directed toward the boiler 15 by the reflector 16. During the shielding of the boiler 15 by the shutters 17 and 18, the boiler 15 cools causing condensation therein which results in the creation of a partial vacuum which forces the check valve 28 open permitting liquid to flow into the boiler 15. As the vacuum is created reverse flow of liquid through the tube 26 is caused exhausting the liquid from the tank or container 23 and permitting the spring 22 to raise the arm 19 and the shutters 17 and 18 to the solid line position so that the sun's rays are again concentrated upon the boiler 15 for the next cycle of operation. The insulating sleeve 29a at the outlet valve 29 and between the valves 29 and 30 is adapted to insulate the outlet tube 29b which receives steam from the boiler 15. The check valve 30 permits a vacuum to be created in the tube portion 29b which will cooperate with the vacuum in the boiler 15 in order to draw water through the check valve 28 and the check valve 29 during each cycle of operation when increasing the capacity of flow through our solar energy pump when the sun's rays are sufficiently concentrated and when the metering valve 25 is adjusted to correspond therewith.

Though we have shown and described a particular construction, combination and arrangement of parts and portions, and a certain modification, we do not wish to be limited to this particular construction, combination and arrangement but desire to include in the scope of our invention, the construction, combination and arrangement substantially as set forth in the appended claims.

Having thus described our invention, what we claim as new and desire to secure by Letters Patent is:

1. In a solar energy pump, a plurality of boilers mounted for rotation together about a common horizontal axis, a condenser adapted to concentrate the sun's rays successively on the lowermost of said boilers, a check valve communicating with the interior of each individual boiler and adapted to permit the flow of liquid thereinto and a secondary check valve communicating with each individual boiler providing an outlet therefor adapted to prevent the flow of liquid into each individual boiler but permit the flow therefrom, an inlet conductor communicating with each of said first mentioned valves and a supply of liquid, an outlet conductor communicating with said second mentioned valves for delivering fluid under pressure.

2. In a solar energy pump, a boiler, a condenser adapted to direct the sun's rays toward said boiler, a check valve communicating with the interior of said boiler adapted to permit the flow of liquid thereinto and a secondary check valve communicating with said boiler providing an outlet therefor adapted to prevent the flow of liquid into said boiler but permit the flow therefrom, an inlet conductor communicating with said first mentioned valves and a supply of liquid, an outlet conductor communicating with said second mentioned valve for delivering fluid under pressure and means for alternately permitting and interrupting the sun's rays passing from said condenser with respect to said boiler.

3. In a solar energy pump, a liquid inlet manifold, a liquid outlet manifold, a plurality of boilers interconnecting said inlet manifold and said outlet manifold, each of said manifolds having a tubular conductor at the middle thereof forming a rotating axis therefor, each of said boilers having a check valve communicating with said inlet manifold to prevent flow thereinto and a check valve communicating with the outlet manifold preventing flow into the boilers, each of said valves permitting flow in the same direction from said inlet manifold through said boiler and outwardly into said outlet manifold, a sunlight condenser adapted to concentrate the heat of the sun's rays onto the lowermost of said boilers.

4. In a solar energy pump, a liquid inlet manifold, a liquid outlet manifold, a plurality of boilers interconnecting said inlet manifold and said outlet manifold, each of said manifolds having a tubular conductor at the middle thereof forming a rotating axis therefor, each of said boilers having a check valve communicating with said inlet manifold to prevent flow thereinto and a check valve communicating with the outlet manifold preventing flow into the boilers, each of said valves permitting flow in the same direction from said inlet manifold through said boiler and outwardly into said outlet manifold, a sunlight condenser adapted to concentrate the heat of the sun's rays onto the lowermost of said boilers and whereby heating of the lowermost of said boilers causes evaporation of the liquid therein with resultant pressure which forces liquid outwardly through said outlet manifold.

5. In a solar energy pump, a liquid inlet manifold, a liquid outlet manifold, a plurality of boilers interconnecting said inlet manifold and said outlet manifold, each of said manifolds having a tubular conductor at the middle thereof forming a rotating axis therefor, each of said boilers having a check valve communicating with said inlet manifold to prevent flow thereinto and a check valve communicating with the outlet manifold preventing flow into the boilers, each of said valves permitting flow in the same direction from said inlet manifold through said boiler and outwardly into said outlet manifold, a sunlight condenser adapted to concentrate the heat of the sun's rays onto the lowermost of said boilers and whereby heating of the lowermost of said boilers causes evaporation of the liquid therein with resultant pressure which forces liquid outwardly through said outlet manifold and; each of said boilers having an exhaust tube therein communicating with the respective outlet check valves adapted to be fitted over the respective inlet check valves for direct communication of the check valves internally of the boiler permitting fluid of a low boiling temperature to be used internally of the boilers while liquid is conducted through said exhaust tube.

6. In a solar energy pump, a liquid inlet manifold, a liquid outlet manifold, a plurality of boilers interconnecting said inlet manifold and said outlet manifold, each of said manifolds having a tubular conductor at the middle thereof forming a rotating axis therefor, each of said boilers having a check valve communicating with said inlet manifold to prevent flow thereinto and a check valve communicating with the outlet manifold preventing flow into the boilers, each of said valves permitting flow in the same direction from said inlet manifold through said boiler and outwardly into said outlet manifold, a sunlight condenser adapted to concentrate the heat of the sun's rays onto the lowermost of said boilers and whereby heating of the lowermost of said boilers causes evaporation of the liquid therein with resultant pressure which forces liquid outwardly through said outlet manifold and each of said boilers having an exhaust tube therein communicating with the respective outlet check valves adapted to be fitted over the respective inlet check valves for direct communication of the check valves internally of the boiler permitting fluid of a low boiling temperature to be used internally of the boilers while liquid is conducted through said exhaust tube and said exhaust tube being of resilient character.

7. In a solar energy pump, a liquid inlet manifold, a liquid outlet manifold, a plurality of boilers interconnecting said inlet manifold and said outlet manifold, each of said manifolds having a tubular conductor at the middle thereof forming a rotating axis therefor, each of said boilers having a check valve communicating with said inlet manifold to prevent flow thereinto and a check valve communicating with the outlet manifold preventing flow into the boilers, each of said valves permitting flow in the same direction from said inlet manifold through said boiler and outwardly into said outlet manifold, a sunlight condenser adapted to concentrate the heat of the sun's ray onto the lowermost of said boilers and whereby heating of the lowermost of said boilers causes evaporation of the liquid therein with resultant pressure which forces liquid outwardly through said outlet manifold and each of said boilers having an exhaust tube therein communicating with the respective outlet check valves adapted to be fitted over the respective inlet check valves for direct communication of the check valves internally of the boiler permitting fluid of a low boiling temperature to be used internally of the boilers while liquid is conducted through said exhaust tube and said exhaust tube being of resilient character and detent means for indexing any one of the boilers in the heat concentration area of the condenser.

8. In a solar energy pump, a boiler, a condenser for concentrating the heat rays of the sun on the boiler, an inlet for said boiler having a check valve, an outlet for said boiler having a check valve, a resilient tube interconnecting said check valves permitting flow of liquid through said tube and a fluid having a low boiling temperature in said boiler externally of said tube.

9. In a solar energy pump, a boiler having an inlet and an outlet, a check valve for said inlet and a check valve for said outlet, liquid communicating with said inlet, a condenser for concentrating heat rays of the sun on said boiler, a shield movably mounted with respect to said boiler and adapted to be disposed between said boiler and said condenser, a lever connected with said shield having a liquid tank thereon, a tube communicating with the interior of said boiler and said tank, a metering valve in said tube whereby pressure in said boiler causes liquid to rise in said tank for shifting said lever and moving said shield intermediate said boiler and said condenser.

10. In a solar energy pump, a boiler having an inlet and an outlet, a check valve for said inlet and a check valve for said outlet, liquid communicating with said inlet, a condenser for concentrating heat rays of the sun on said boiler, a shield movably mounted with respect to said boiler and adapted to be disposed between said boiler and said condenser, a lever connected with said shield having a liquid tank thereon, a tube communicating with the interior of said boiler and said tank, a metering valve in said tube whereby pressure in said boiler causes liquid to rise in said tank for shifting said lever and moving said shield intermediate said boiler and said condenser and resilient means for raising said lever when said boiler cools creating a vacuum which draws the liquid out of said tank for removing said shield from its position between said boiler and said condenser.

References Cited in the file of this patent

UNITED STATES PATENTS

| Number | Name | Date |
| --- | --- | --- |
| 2,015,240 | Scott-Snell et al. | 1935 |
| 2,461,032 | Bush | Feb. 8, 1949 |